United States Patent [19]

Yamasaki

[11] Patent Number: 4,953,200
[45] Date of Patent: Aug. 28, 1990

[54] PRIVATE BRANCH EXCHANGE CAPABLE OF DISCRIMINATING DIFFERENT TYPES OF TELEPHONE SETS CONNECTED THERETO

[75] Inventor: Hajime Yamasaki, Fukuoka, Japan

[73] Assignee: Matsushita Electric Industrial Co., Ltd., Osaka, Japan

[21] Appl. No.: 342,884

[22] Filed: Apr. 25, 1989

[30] Foreign Application Priority Data

Apr. 28, 1988 [JP] Japan .................................. 63-106357

[51] Int. Cl.[5] .......................... H04M 1/00; H04Q 5/00
[52] U.S. Cl. ...................................... 379/156; 379/166; 379/324; 379/377; 379/413
[58] Field of Search ........................ 379/156, 164–166, 379/324, 377, 383, 413, 157, 159, 160

[56] References Cited

U.S. PATENT DOCUMENTS

| | | | |
|---|---|---|---|
| 4,088,844 | 5/1978 | Kinnard, Jr. .......................... | 379/383 |
| 4,088,846 | 5/1978 | McEowen ............................ | 379/159 |
| 4,220,827 | 9/1980 | Burke et al. ......................... | 379/164 |
| 4,254,306 | 3/1981 | Sekiguchi et al. ................... | 379/164 |
| 4,327,256 | 4/1982 | Crooks et al. ....................... | 379/156 |
| 4,572,928 | 2/1986 | Nishimura et al. ................. | 379/156 |
| 4,759,059 | 7/1988 | Christensen .......................... | 379/166 |

FOREIGN PATENT DOCUMENTS 60-96992  5/1985  Japan .................................... 379/156

Primary Examiner—Jin F. Ng
Assistant Examiner—Wing F. Chan
Attorney, Agent, or Firm—Stevens, Davis, Miller & Mosher

[57] ABSTRACT

A private branch exchange for use with different types of telephone sets comprises a current detection device such as a photo-coupler for detecting a current flowing through a data line connecting to a multifunction telephone set to discriminate among different types of telephone sets and a current limiting circuit for limiting a current supplied from a power source device through a voice line in accordance with an detected output from said current detection device.

4 Claims, 2 Drawing Sheets

PRIVATE BRANCH EXCHANGE CAPABLE OF DISCRIMINATING DIFFERENT TYPES OF TELEPHONE SETS CONNECTED THERETO

BACKGROUND OF THE INVENTION

The present invention relates to a private branch exchange which can connect ordinary telephone sets with dedicated multi-function telephone sets or the like.

The telephone sets which are connected with a private branch exchange as extension end devices comprise many kinds of telephone sets including "standard" telephone sets, and multi-function telephone sets having various functions, etc. One of such multi-function telephone sets is generally called "key telephone". By providing lines for data communication lines (hereinbelow referred to as "data lines") between the exchange and the telephone sets in addition to voice lines, the key telephone serves to communicate several kinds of control data between the exchange and the key telephone set through the data lines. The exchange with which the key telephone can be connected is provided with a voice terminal and a data terminal in one extension port.

Some of such exchanges are constituted so that ordinary telephone sets which do not have data lines can also be connected therewith. Namely, in such an exchange, ordinary telephone sets are connected with the voice lines and the voice circuit section in the exchange has a like circuit arrangement with that of the exchange designed for ordinary telephone sets. Further, the internal voice circuit characteristic viewed from the voice line terminal is also adapted identically or similarly with that of the exchange dedicated to ordinary telephone sets so that the exchange can be used as it is even when the ordinary telephone sets are connected. Therefore, the exchange is adapted so that information of off hook and on-hook is detected as a change in a D.C. loop current like the exchange for ordinary telephone sets. Namely, a predetermined D.C. voltage is applied to the voice line (tip: T-line and ring-line: R-line) by a D.C. power source as in the exchange for ordinary telephone sets.

The above arrangement of the exchange provides the following problem. Conventional exchanges which permit use of both ordinary telephone sets and multi-function telephone must have an operation state changed in accordance with whether an ordinary telephone set is connected or a multi function (key) telephone set is connected. To this end, in connecting a telephone set with the exchange, a switch is provided to set which kind of telephone set is connected with which terminal. Such a setting of the switch is commonly carried out by a service man. Therefore, each time the telephone set is to be changed or the number of the telephone sets is to be increased, the service man must be called. This is very troublesome.

SUMMARY OF THE INVENTION

An object of the present invention is to provide a private branch exchange which can discriminate which kind of telephone set is connected to it.

In order to attain this object, in accordance with the present invention, there is provided a private branch exchange comprising a current detection means for detecting a current flowing through a data line and a current limiting means for limiting the current supplied from a power source device through a voice line in accordance with a detected output from the current detection means.

In the above arrangement, the connection of a dedicated multi-function telephone set is detected by the current on the data line and hence the current flowing through the voice line can be automatically limited.

DESCRIPTION OF THE PREFERRED EMBODIMENT

Figure 1:
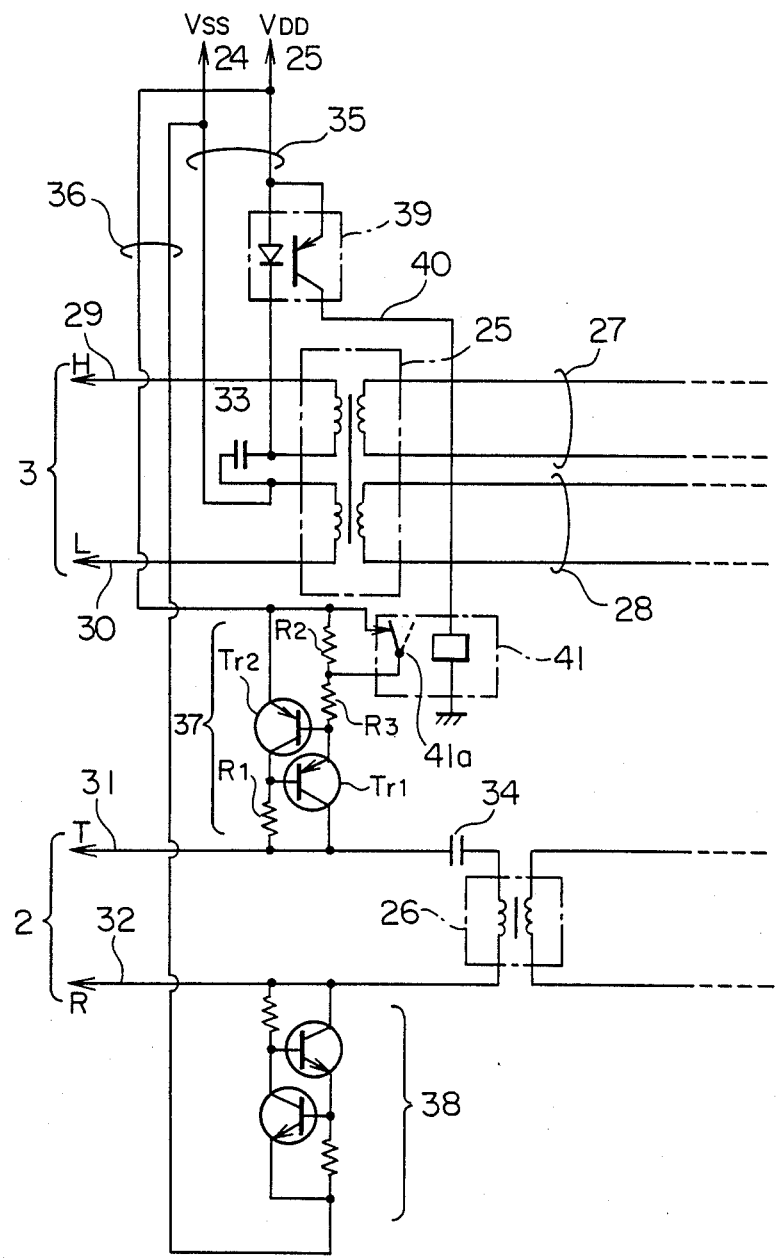
FIG. 1 is a circuit diagram of the main part of a private branch exchange in accordance with the present invention.

Now referring to the drawings, one embodiment of the present invention will be explained. First, an arrangement of the private branch exchange (hereinafter referred to as exchange) and also of a dedicated multi-function telephone set hereinafter referred to as a key telephone will be explained.

Figure 2:
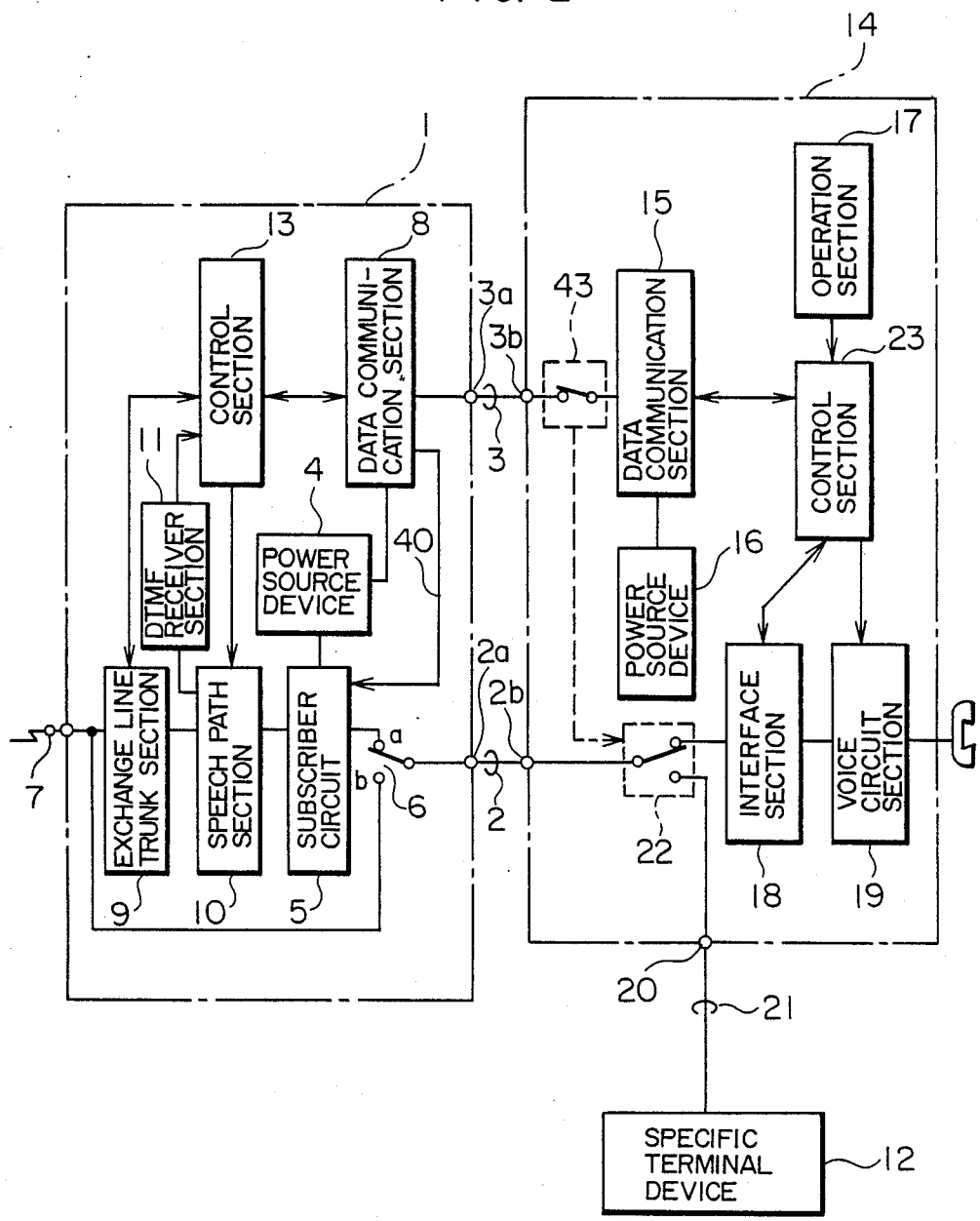
FIG. 2 is a block diagram of the private branch exchange in accordance with the present invention and a dedicated multi-function key telephone set connected therewith.

FIG. 2 is a block diagram of the state where a key telephone 14 is connected with an exchange 1 in accordance with the present invention. As usual, the exchange 1 is provided with a voice line 2 for transmitting a voice signal and a data line 3 for transmitting several kinds of control data for one extension. 2a, 2b are connectors for connection of the voice line 2 and 3a, 3b are connectors for connection of the data line 3. 4 is a power source device for receiving electrical power from a commercial power source to supply a D.C. loop current to the voice line 2 and the data line 3. 5 is a line equipment (subscriber circuit) for monitoring the D.C. loop current on the voice line 2 and a pulse dial signal and carrying the D.C. loop current. The line equipment 5 is provided therein with a current limiting device mainly including a semiconductor device for limiting the D.C. current supplied from the power source device 4. 6 is a relay contact which connects with contact b when a supply of electrical power from the commercial power source to the power source device 4 is stopped thereby to directly connect the voice line 2 to a station line 7. The contact 6 connects with the contact a while electrical power is being supplied from the commercial power source to the power source device 4. 8 is a data communication section for realizing data communication between the exchange and the key telephone. The data line 3 is connected with the data communication section 8. The data communication set 8 serves to carry the D.C. current on the data line 3 and supply the electrical power to the key telephone through the data line 3. 9 is a station line trunk section, connected with the station line 7 from an exterior exchange station, for an electric interface with the station line 7. 10 is a speech path section for performing an exchange-connection operation between a plurality of extensions and an outside line in which the line equipment 5 provided for each of the plurality of extensions and the station line trunk section 9 are connected to each other for a voice communication. 11 is a dual tone multi frequency (DTMF) receiving section which is connected with the speech path section 10 which is connected with the station line trunk section 9 and the line equipment 5 and so to DTMF can be connected with the line equipment 5. In the case where a specific terminal device 12 as well as the key telephone 14 is connected to the extension, the DTMF receiving section 11 can receive, through the line equipment 5, a multi-frequency selection signal transmitted from the specific terminal device 12 through the voice line 2. 13 is a control section for performing a control operation for the above respective sections while communicating several kinds of information with the key telephone through the data communication section 8 and receiving information from the DTMF receiving section 11 and the other devices.

An arrangement of the key telephone 14 in this embodiment will be explained. 15 is a data communication section for realizing data communication with the exchange 1. The data line 3 is connected with the data communication section 15. 16 is a power source device for supplying electrical power, which is transmitted from the exchange 1 through the data line 3, to the respective sections in the key telephone 14. 43 is a manual switch, provided between a jack 20 for the data line 3 and the data communication section 15, for manually separating the data line 3 from the key telephone 14. 17 is an operation section on which a dial button, an outside selection button, and a function button for controlling the key telephone 14 are provided. 18 is an interface section which serves to realize an electric interface with the exchange and the station line from the exterior and to protect the respective sections from pulse noise or the like from the exterior. 19 is a voice circuit section which permits voice communication comprising an amplifier, an analog switch, etc. for sound amplification or conferencing or the like for speech communication. The key telephone 14 is provided with the modular jack 20 with which an ordinary telephone set or a specific terminal device 12 such as a facsimile can be connected. If the specific terminal device is to be connected with the exchange 1, an attached subscriber's line 21 connected with the specific terminal device is connected with the modular jack 20. 22 is an exchange switch for exchanging the voice line 2 between the interface section 18 and the modular jack 20 connected with the specific terminal device 12; the exchange switch 22 operates in response to an electric signal from the exterior. Further, the exchange switch 22 is adapted to manually operate in engagement with the manual switch 43. 23 is a control section for performing a control operation for the respective sections such as the voice circuit section 19 while receiving an input from the operation section 17 and communicating several kinds of information with a key telephone through the data communication section 8. Unlike the case where an ordinary telephone set is connected, information of off-hook and on-hook from the key telephone is transferred from the control section 23 to the exchange 1 through the data communication section 15 and the data line 3. The control section 23 also serves to switch the exchange switch 22.

Referring to FIG. 1, detailed explanation will be given for the circuit of a D.C. current supply section of the data communication section 8 and the line equipment 5. In FIG. 1, 25 is a two-wire four-wire transformer for a data transfer line provided in the data communication section 8, in which a data line 27 in the transmission direction and a data line 28 in the reception direction are connected with the primary side while an H-line 29 and an L-line 30 of the data line 3 are connected with the secondary side. 26 is a speech transformer provided in the line equipment 5, in which a T-line 31 and R-line 32 of the voice line 2 are connected with its secondary side. 33 is a capacitor for cutting the D.C. current which is inserted in series with the secondary side of the two-wire four-wire transformer 25. 34 is a capacitor for cutting the D.C. current which is inserted in series with the secondary side of the speech transformer 26. 35 is a current supply line for supplying current from the power source device 4 to the H-line 29 and L-line 30. 36 is a current supply line for supplying current from the power source device to the T-line 31 and R-line 32. One of a pair of current supply lines 36 is connected with the T-line 31 through a current limiting circuit 37 whereas the other thereof is connected with the R-line 32 through a current limiting circuit 38. 39 is a photo-coupler for current detection in which a light emitting diode is inserted in the current supply line 35, and 40 is its output line connected with an emitter of a photo-transistor constituting the photo-coupler 39.

An arrangement of the current limiting circuit 37 will be explained in detail. Tr 1 is a transistor for current amplification; and Tr 2 and R1 are a transistor and a resistor for current feedback. The base voltage of the transistor Tr 1 is proportional to the emitter current of the transistor Tr 1 and the base voltage of the transistor Tr 2 also depends on the emitter current. Thus, if the emitter current of the transistor Tr 1 is increased, the base current of the transistor Tr 2 is also increased. When the base current of the transistor Tr 2 exceeds a certain threshold value, a collector current starts to flow in the transistor Tr 2 (ON state). Then, a voltage is present across the feedback resistor R1 so that the base current of the transistor Tr 1 is limited and also the emitter current of the transistor Tr 1 is limited. Due to such a feedback operation, the emitter current of the transistor Tr 1 will be always stabilized to be a constant current. The substantially whole emitter current of the transistor Tr 1 thus stabilized flows to the T-line 31 and the R-line line 32 as a loop current. Another factor defining the base current of the transistor Tr 2 is resistors, i.e. R2 and R3, connected between the base and emitter of the transistor Tr 2.

The current limiting circuit 37 is adapted to take two states, i.e. a high current state allowing a high current to flow and a low current state allowing a low current to flow. The low current state means a state where a contact 41a of a relay 41 is opened and the resistors R2 and R3 are connected between the base and emitter of the transistor Tr 2. In this state, the base current of the transistor Tr 2 is increased to a predetermined threshold value even when the emitter current of the transistor Tr 1 is comparatively low, and then the transistor Tr 2 is turned on. On the other hand, the high current state means a state where both ends of the resistor R2 are short-circuited by the contact 41a of the relay 41 and only the resistor R3 is inserted between the base and emitter of the transistor Tr 2. In this state, the base current of the transistor Tr 1 will not be increased to the above threshold value unless the emitter current of the transistor Tr 1 is increased to a certain extent. The transistor Tr 1 is turned on after the emitter current of the transistor Tr 1 has been sufficiently increased. The output line 40 of the photo-coupler 39 is connected with the relay 41 so that the relay 41 is controlled by a detected output from the photo-coupler 39. More specifically, when the photo-coupler 39 is in the ON-state, the relay 41 is placed in the break state and so the contact 41a is opened. When the photo-coupler 39 is in the OFF state, the relay 41 is placed in the make state and so the contact 41a is closed.

The current limiting circuit 38 will not be explained here since although it does not have a current exchanging function, its arrangement is the same as the current limiting circuit 37.

Assuming that the loop current to be supplied to the T-line 31 and the R-line 32 is A(A) in the state where an ordinary telephone set is connected, and the loop current to be supplied to the T-line 31 and the R-line 32 is B(A) in the state where a dedicated key telephone is connected, the resistances of the resistor R2 and the resistor R3 are can be calculated by the following equations:

R2=V (A-B)/AB

R3=V/A where V is a base-emitter voltage of the transistor Tr 2 when the transistor Tr 2 is placed in the ON state. The loop current A in the state where the ordinary telephone set is connected is actually 30 (mA) or so whereas the loop current B in the state where the key telephone is connected is actually 7 (mA) or so.

The operation of the exchange will be explained. First, explanation will be given for the case where the key telephone is connected with the exchange. When the key telephone 14 is connected with the exchange 1, a current of 20 mA, for example, flows from the power source device 4 through the data line 3 to operate the key telephone 14. The photo-coupler 39 arranged in the exchange 1 detects the current flowing through the data line 3 and turns on. Then, the relay 41 is placed in the break state and so the contact 41a is opened. Thus, the current limiting circuit 37 is placed in the low current state. In this state, even when the key telephone 14 is placed in the off-hook state, the current flowing through the voice line 2 will be a minute value as small as 7 mA. In the on-hook state, the loop current does not flow. Such a condition remains unchanged as long as the current flows through the data line 3.

Explanation will be given for the case where an ordinary telephone set is connected in place of the key telephone. Since the ordinary telephone set is connected with only the voice line 2, the data line 3 is placed in the open state. Thus, the current does not flow through the data line 3 so that the photo-coupler 39 turns off. Then, the relay 41 is placed in the make state and so the contact 41a is closed. Thus, the current limiting circuit 37 is placed in the high current state, which permits a high current to flow through the voice line 2. Therefore, if the ordinary telephone set is placed in the off-hook state, the loop current as large as 30 mA or so will flow through the voice line 2. On the other hand, in the on-hook state, the loop current will be very small or does not entirely flow. Thus, the information of off-hook and on-hook when the ordinary telephone set is connected with the exchange can be transferred to the exchange as a change of the D.C. loop current.

Meanwhile, if the D.C. loop current flowing through the data line 3 is stopped by the manual switch 43 on the key telephone 14 in the state where key telephone is connected with the exchange, the current limiting circuit 37 will be shifted to the high current state. Then, if the ordinary telephone set 14 is placed in the off-hook state, a large loop current flows through the voice line 2. Thus, in such an arrangement, the current limiting circuit 37 in the exchange 1 can be controlled by the manual switch 43 on the key telephone 14, which is very convenient for a user.

In the conventional arrangement, a relatively large loop current flows through both data line and voice line in each of the extensions with which key telephones are connected, so that the total current to be supplied by a power source device is very large. Even if the key telephones are connected with all of the extensions, the current required for each extension must be supplied. Therefore, the power source device is required to have a very high capability. On the other hand, in the arrangement of this embodiment, the current to be supplied for each of the key telephones in the case where the key telephones are connected does not exceed a sum of the current (about 20 mA) flowing in data line 2 and the current flowing in voice line 3 in the low current state, and so can be limited to a very low value as compared with the conventional arrangement. Therefore, the requirement for the power source device 4 can be relaxed. Namely, the power source device 4 is permitted to have a relatively low current supplying capability so that the production cost of the exchange can be reduced to that degree.

As mentioned above, in accordance with the present invention, a current detecting means (photo-coupler) for detecting that the D.C. loop current has been supplied to the data line is provided so that the exchange can discriminate which kind of telephone set is connected therewith. Further, there is provided a current limiting means for limiting the current to be supplied from the power source device to the voice line in accordance with the detected output from the current detecting means. Therefore, in the case where the key telephone is connected with the exchange, even if its hook switch is closed (off-hook switch), a large D.C. loop current does not flow through the voice line. In the case where the ordinary telephone set is connected with the exchange, the large D.C. loop current flows through the voice line. However, the current on the data line is stopped in that state so that the large current will not flow simultaneously through the data line and the voice line. Thus, power consumption due to the D.C. resistance components on the data line and the voice line can be greatly reduced. Moreover, if the D.C. current loop for the data line is opened or closed using the manual switch on the key telephone, the current limiting means in the exchange can be controlled. This is very convenient in the case where the specific terminal device (e.g. facsimile) attached to the key telephone is employed individually. More specifically, after the exchange switch has been switched on the specific terminal device side, the user can operate the manual switch so as to stop the D.C. loop current on the data line, thereby supplying the large loop current through the voice current. Therefore, through such a simple operation, necessity of operating the exchange switch while the D.C. loop current flows can be eliminated unlike the conventional arrangement. Thus, pulsating noise can be greatly reduced and also possibility of damaging the contact of the exchange switch can be decreased. Furthermore, if a two-wire ordinary telephone set is connected with the extension port in issue, the D.C. loop current on the data line is stopped. thus, the exchange switch can be automatically switched without requiring any particular operation for varying the D.C. loop current so that a suitable loop current flows through the voice line.

I claim:

1. A private branch exchange comprising:

a power source device for supplying a D.C. loop current through a data line for data communication with an extension telephone set and through a voice line for transferring a voice signal for the extension telephone set;

current detection means for detecting that the D.C. loop current has been supplied through said data line; and current limiting means for limiting the current supplied from said power source device through said voice line in accordance with a detected output from said current detection means.

2. A private branch exchange comprising:

a power source device for supplying a D.C. loop current through a data line for data communication with an extension telephone set and through a voice line for transferring a voice signal for the extension telephone set;

current detection means for detecting that the D.C. loop current has been supplied through said data line; and current limiting means for limiting the current supplied from said power source device through said voice line in accordance with a detected output from said current detection means and also for performing a constant current operation.

3. A private branch exchange comprising:

a power source device for supplying a D.C. loop current through a data line for data communication with an extension telephone set and through a voice line for transferring a voice signal for the extension telephone set;

a light emitting device connected in series with said data line;

switching means which turns on or off in response to light from said light emitting device; and current limiting means for limiting the current supplied from said power source device through said voice line in accordance with the on or off state of said switching means.

4. A private branch exchange according to claim 3, wherein said light emitting device is a light emitting diode.

* * * * *